Sharron P. Doane. Adjustable Reel for Headers.

N° 86375

PATENTED FEB 2 1869

Witnesses.
Geo. H. Strong
J. Lee Boone

Inventor.
S. P. Doane
By his atty, Dewey & Co.

UNITED STATES PATENT OFFICE.

SHARRON P. DOANE, OF SAN FRANCISCO, CALIFORNIA, ASSIGNOR TO HIMSELF AND LEONARD TREADWELL, OF SAME PLACE.

IMPROVEMENT IN HARVESTERS.

Specification forming part of Letters Patent No. 86,375, dated February 2, 1869.

*To all whom it may concern:*

Be it known that I, SHARRON P. DOANE, of the city and county of San Francisco, State of California, have invented an Improved Adjustable Reel for Headers; and I do hereby declare the following description and accompanying drawings are sufficient to enable any person skilled in the art or science to which it most nearly appertains to make and use my said invention without further invention or experiment.

My invention relates to an improvement in that class of machines known as headers or harvesters; and it consists in so connecting the reel which brings the standing grain to the knives that it is constantly adjustable, and can be raised or lowered by the driver when necessary. This is accomplished by attaching the reel to the frame of the machine by levers at either end, and more especially so that the belts are not affected by raising or lowering the reel. These levers are connected by another series with a hand-lever, by which the whole are operated, and which is within easy reach of the driver.

To more fully explain my invention, reference is had to the accompanying drawings, forming part of this specification, of which—

Figure 1:
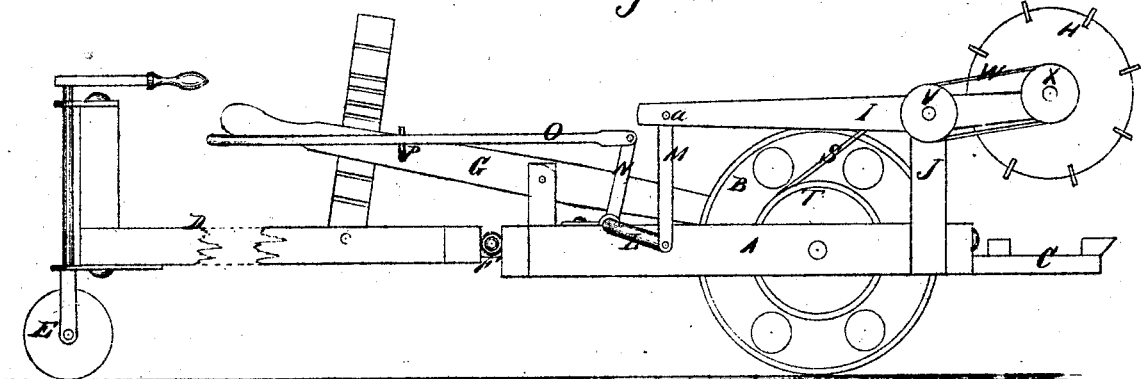
Figure 2:
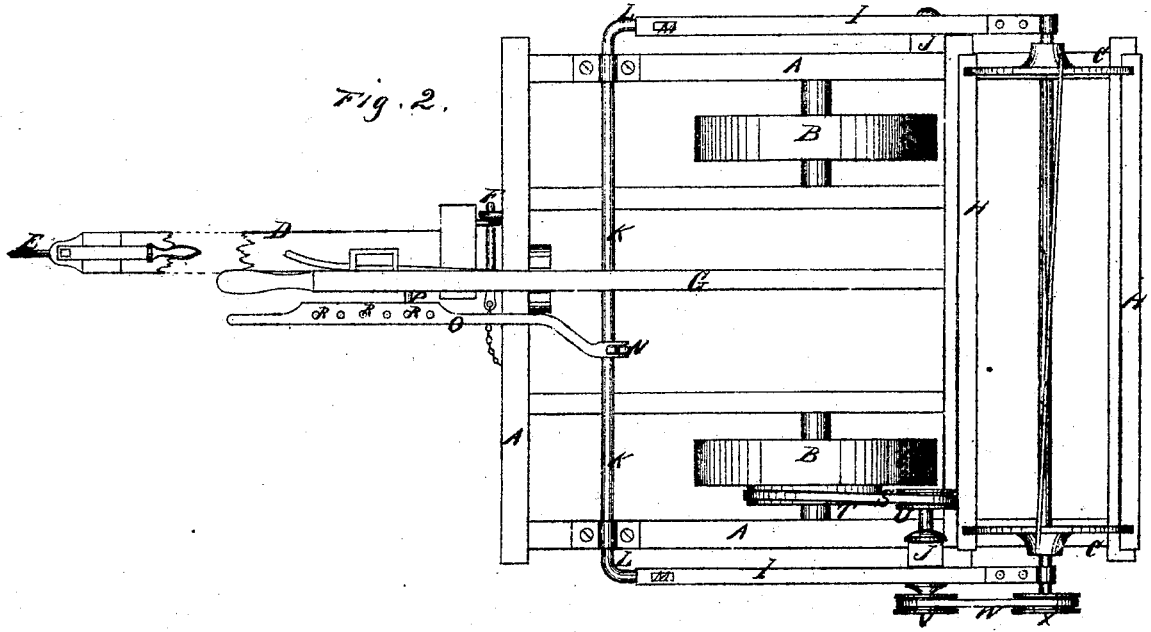

Figure 1 is a side elevation of my device. Fig. 2 is a plan.

Similar letters of reference of each of the figures indicate like parts.

A is the frame of a header, mounted upon the wheels B B, and having the platform C in front, which supports the carrying-belt and the knives. D is the pole, to which the horses are attached, having also the steering-wheel E, which is operated by the driver. The pole is hinged at F, and the lever G serves to raise and lower the front of the machine with the knives, these devices being the same which are now in use.

The reel H, as ordinarily constructed, is so attached to the machine that it is necessary to stop and spend some time in adjusting it for any particular land or grain; and when so adjusted it is fixed, and can only be changed by again stopping the machine.

In this arrangement the reel has its bearings in the ends of the levers I I, which move on an axis in the top of the upright posts J J. A shaft, K, extends entirely across the frame, as shown, and has at each end an arm, L. These arms are connected with the long arm of the lever at *a* by the rods M. From the center of the shaft K another arm, N, arises, to the end of which the operating-rod O is attached, and extends back within easy reach of the driver, where it may be held at any point by the pin P entering holes R in the rod, or similar device.

The driving-belt S is moved by a pulley, T, at the side of one of the driving-wheels, and passes from this over the pulley U. The axle or shaft of this pulley carries the pulley V at its outer end, and the belt W, passing from this to the pulley X on the reel-shaft, drives the reel. The shaft of the pulleys U and V serves also as the center or fulcrum, about which the supporting-levers I I of the reel turn, so that in whatever position the reel may be the relative distance between the pulleys is always preserved, and the belts are, consequently, always in proper adjustment.

By this device the reel may be instantly raised or lowered by the driver when desired, and no stoppage need occur.

Having thus described my invention, what I claim, and desire to secure by Letters Patent, is—

1. The levers I I, shaft K, arm N, and rods M and O, combined and arranged substantially as described, for the purpose specified.

2. In combination with the levers I I, supporting a harvester-reel, the arrangement of the pulleys U and V on an axis, forming the fulcrum of one of said levers, substantially in the manner and for the purposes described.

In witness whereof I have hereunto set my hand and seal.

SHARRON P. DOANE. [L. S.]

Witnesses:
JNO. L. BOONE,
GEO. H. STRONG.